US005627371A

United States Patent [19]
Griffith et al.

[11] Patent Number: 5,627,371
[45] Date of Patent: May 6, 1997

[54] TILTING POSITIONER FOR A MICROPOSITIONING DEVICE

[75] Inventors: Joseph E. Griffith, Berkeley Heights; Rafael N. Kleiman, New Brunswick, both of N.J.

[73] Assignee: Lucent Technologies Inc., Murray Hill, N.J.

[21] Appl. No.: 600,658

[22] Filed: Feb. 9, 1996

[51] Int. Cl.⁶ .................................................. G01N 23/00
[52] U.S. Cl. ...................................... 250/306; 250/442.11
[58] Field of Search .................................. 250/306, 307, 250/440.11, 442.11; 310/311, 328, 366

[56] References Cited

U.S. PATENT DOCUMENTS

| | | | |
|---|---|---|---|
| 5,103,094 | 4/1992 | Hayes et al. | 250/306 |
| 5,173,605 | 12/1992 | Hayes et al. | 250/306 |
| 5,200,617 | 4/1993 | Hayes et al. | 250/306 |
| 5,306,919 | 4/1994 | Elings et al. | 250/442.11 |
| 5,325,010 | 6/1994 | Besocke et al. | 250/442.11 |

OTHER PUBLICATIONS

"Dimensional metrology with scanning probe microscopes"—J. E. Griffith et al —J. Appl. Phys., vol. 74, No. 9, Nov. 1, 1993 —pp. 83–109.

Primary Examiner—Jack I. Berman
Assistant Examiner—Kiet T. Nguyen

[57] ABSTRACT

A scanning probe microscope positioner including an elongated rigid member which is controllably tilted in a predictable manner. One end of the rigid member is subjected to differential motion on opposite sides of its longitudinal axis so as to cause its opposite end to partake of lateral displacement which is a magnification of the differential motion. By a careful selection of component materials and sizes, inherent thermal compensation can be attained.

21 Claims, 4 Drawing Sheets

TILTING POSITIONER FOR A MICROPOSITIONING DEVICE

BACKGROUND OF THE INVENTION

This invention relates to a small motion transducer positioner for use in a micropositioning device to control the position of a probe tip relative to the surface of a sample under observation and, more particularly, to an improved positioner for eliminating Abbá offset error even though tilting of the positioner is effected.

Segmented piezoceramic tubes are commonly used as actuators to produce probe tip motion in micropositioning devices such as scanning probe microscopes and profilometers. Such actuators have the advantages of simplicity, long range, small size and stiffness. What is disadvantageous about these actuators is the unpredictable tilting of the end of the tube, which introduces motion that is difficult to measure. This problem, known in the field of dimensional metrology as Abbá offset error, is described, for example, in the article "Dimensional Metrology with Scanning Probe Microscopes" J. Appl. Phys., Volume 74, No. 9, Nov. 1, 1993, pages 83–109. U.S. Pat. No. 5,306,919, issued Apr. 26, 1994, to Elings et al proposes a solution to the problem of unwanted tilting by bending a piezoelectric tube into an S shape. This proposed solution is not entirely satisfactory because the bending leads to unpredictable tilting. It is therefore a primary object of the present invention to provide a positioner for a micropositioning device which eliminates unpredictable tilting so that Abbá offset error is eliminated.

It would also be desirable to provide such a positioner which magnifies actuator movement to achieve long range, is thermally compensated, can be used for two and three dimensional motion, and is of simple construction. It is therefore another object of the present invention to provide a positioner possessing all of these attributes.

SUMMARY OF THE INVENTION

The foregoing and additional objects are attained in accordance with the principles of this invention by providing a positioner for a micropositioning device to control one dimensional horizontal movement between a pair of elements. The positioner comprises a rigid elongated member having a first free end and a second pivot end. The first free end is rigidly coupled to the first element. At least one pair of actuators is pivotally coupled to the pivot end of the elongated member. One example of a suitable actuator is a small motion transducer. The pivotal couplings are affixed to the elongated member such that one coupling in the pair is on the opposing side of the longitudinal axis of the elongated member from the other coupling in the pair. One end of each actuator is affixed to its respective pivotal coupling via a rigid member intermediate support. The other end of each actuator is fixed to a rigid, fixed base (i.e., the second element). Each pair of actuators is controlled in concert to effect movement of the first element by pivoting the pivot end of the elongated member. Control means are provided for energizing the actuators to cause differential motion thereof. In a preferred embodiment, the movement of each small motion transducer actuator is in a direction that is parallel to the longitudinal axis of the elongated member when the elongated member is in an untilted position. Accordingly, the elongated member is caused to tilt in a controlled manner.

In one embodiment of this invention, the pivotal couplings are pivot balls secured to the pivot end of the elongated member and to one of the small motion transducer actuators via the rigid intermediate support member.

In another embodiment of this invention, the positioner is arranged for two dimensional horizontal movement and further includes at least one additional intermediate support member, at least one additional pivotal coupling, and at least one additional small motion transducer actuator. If is advantageous if an additional pair of rigid intermediate support members, an additional pair of pivotal couplings, and an additional pair of small motion transducer actuators are provided for this embodiment. These additional pairs are arranged similarly to the first pairs with a first line through the first and second pivotal couplings orthogonally intersecting a second line through the third and fourth pivotal couplings at the longitudinal axis of the elongated member. Accordingly, the elongated member can be tilted so that its free end partakes of two dimensional horizontal movement within an orthogonal axis coordinate system.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Before describing the invention in detail, it should be understood that where the description refers to a scanning probe microscope, this is not intended to be a term of limitation. A scanning probe microscope is merely an exemplary form of micropositioning device which is a suitable environment for this invention, another such device being a profilometer. Also, while the description specifically refers to piezoelectric material, other materials, such as electrostrictive and magnetostrictive materials, may also be utilized as small motion transducers.

Figure 1:
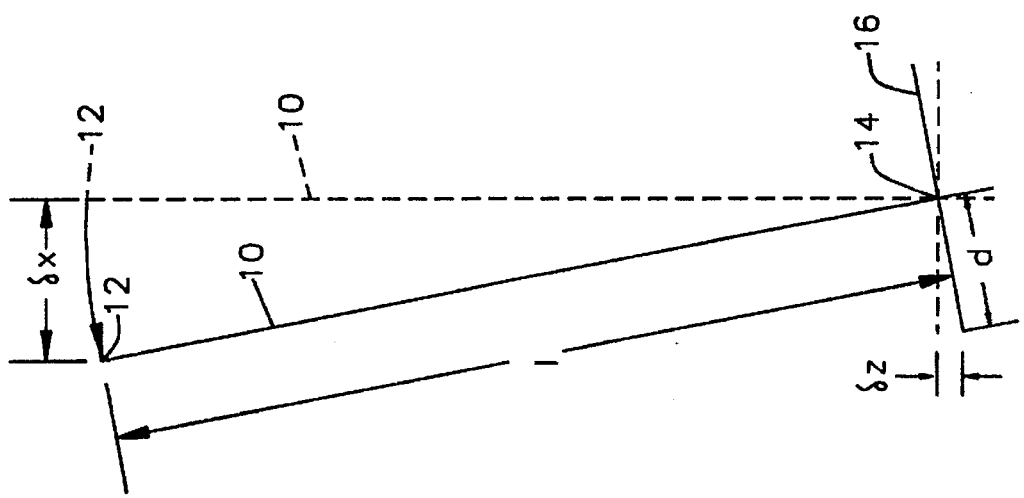
FIG. 1 illustrates tilting movement using a lever principle which magnifies actuator movement.

The inventive design described herein uses the tilting of a moment arm to magnify the relatively short range of movement of small motion transducer actuators. FIG. 1 illustrates such tilting. As shown therein, a rigid elongated member 10 of length L has a free end 12 and a second end 14. The second end 14 is fixed to the center of a cross member 16 having an overall length of $2d$. According to the present invention, a pair of opposing small motion transducer actuators (not shown in FIG. 1) are provided equidistant from the center of the cross member 16. One of the actuators is caused to move its end of the cross member 16 downwardly a small distance $\delta z$ while the other actuator is caused to move its end of the cross member 16 upwardly the same distance δz. This differential motion minimizes vertical movement of the member 10. The vertical displacement δz of the ends of the cross member 16 is magnified into lateral motion δx of the free end 12 of the member 10 by the following relationship:

$$(\delta x/\delta z)=(L/d).$$

This can easily be more than a factor of ten. A second cross member can be provided orthogonal to the cross member 16, along with a second set of actuators, to effect lateral motion of the free end 12 into and out of the plane of the paper, resulting in two dimensional motion.

Figure 2:
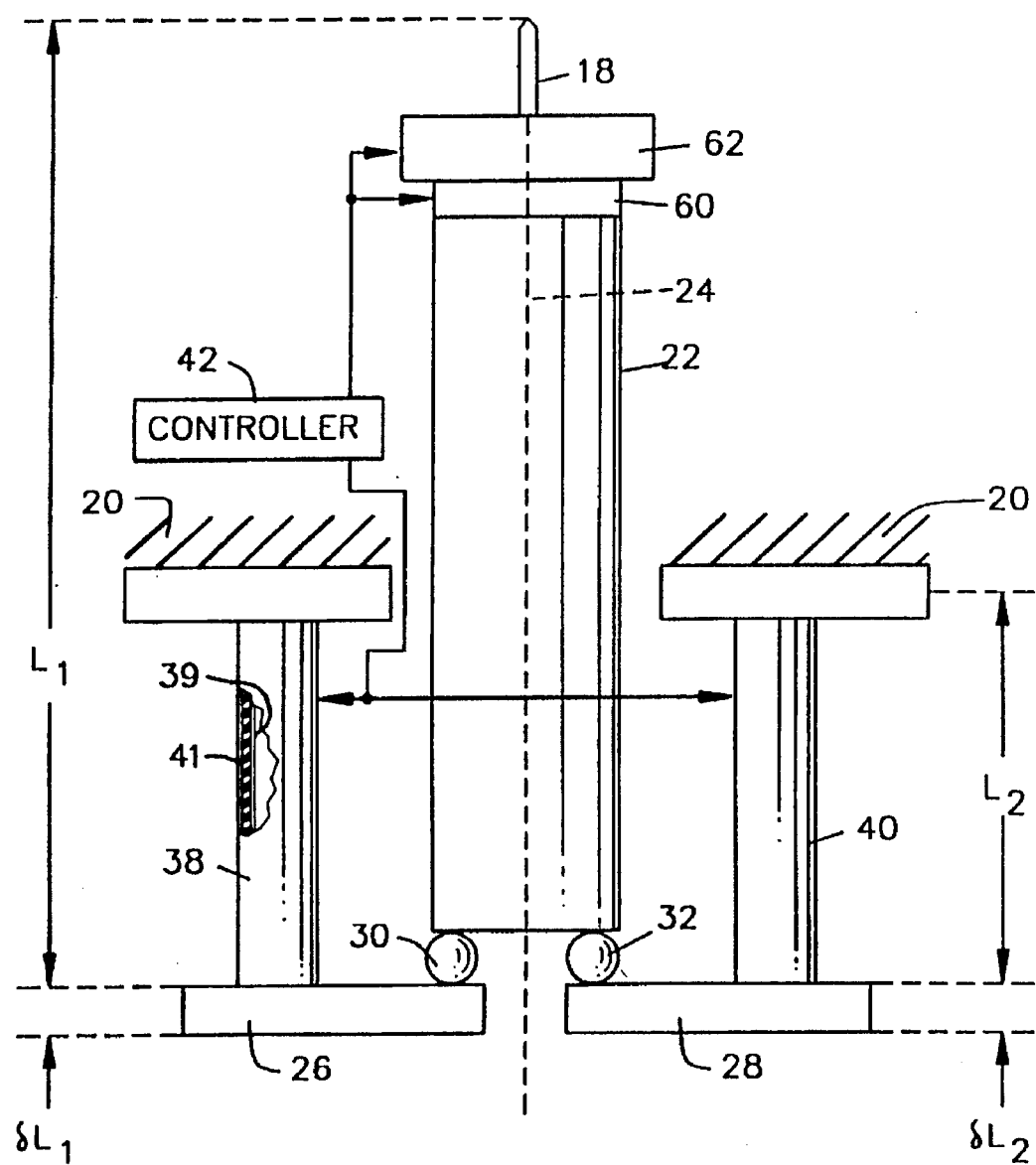
FIG. 2 is a side view of a folded positioner constructed according to this invention using two small motion transducer actuators and arranged for one dimensional horizontal movement by tilting.

FIG. 2 illustrates an inventive physical implementation using the principle shown in FIG. 1 to provide a one dimensional positioner. Thus, FIG. 2 illustrates a folded positioner for controlling one dimensional horizontal movement between a pair of elements. In the illustrative environment of a scanning probe microscope, the first of the elements is the probe tip 18. The second element is the base 20. The sample under observation (not shown) is affixed to the base 20 via a support member (not shown) that permits the sample to be placed in close proximity opposite the probe tip 18. The probe tip 18 is rigidly secured to a first free end of a rigid elongated member 22 so as to prevent relative horizontal movement therebetween. Illustratively, the member 22 is a cylindrical tube of rigid material, such as quartz. While other rigid materials may be utilized, quartz has the advantage of having a low thermal expansion coefficient. The tube 22 has a central longitudinal axis 24 which extends between its opposite ends and the probe tip 18 lies along this axis. The positioner further includes first and second rigid intermediate support members 26, 28. Each of the support members 26, 28 is coupled to the second pivot end of the tube 22 opposite from the probe tip 18 by a respective pivot means 30, 32. Illustratively, each of the pivot means 30, 32 is a solid ruby sphere secured to the respective support 26, 28 and to the tube 22 by epoxy or some other suitable adhesive. In this embodiment, the flexibility of the epoxy allows the rigid tube 22 to pivot on the spheres 30, 32. The balls 30, 32 are on opposite sides of the longitudinal axis 24 and function to effect pivoting movement of the tube 22 relative to the respective one of the support members 26, 28 about respective parallel pivot axes 34, 36 (FIG. 3) orthogonal to the longitudinal axis 24. Small motion transducer actuators 38, 40 are each coupled between the base 20 and a respective one of the support members 26, 28 and are controllable for effecting relative movement between the base 20 and the respective support member 26, 28, each along a line orthogonal to the respective pivot axis 34, 36. In the folded design shown in FIG. 2, the member 22 and the actuators 38, 40 all extend on the same side of the support members 26, 28.

Illustratively, the small motion transducer actuators 38, 40 are hollow piezoceramic cylinders with internal and external electrodes 39,41, respectively. When a voltage of a first polarity is applied across the electrodes, the length of the actuator increases. When a voltage of the opposite polarity is applied across the electrodes, the length of the actuator decreases. Preferably, the actuators 38, 40 are identical and the controller 42, which may include a programmed computer, is connected to the electrodes of the actuators 38, 40 and applies voltages to those electrodes so as to cause one of the actuators 38, 40 to increase in length and the other of the actuators 38, 40 to decrease in length. This differential motion causes the tube 22 to tilt, as previously described with respect to FIG. 1.

Figure 3:
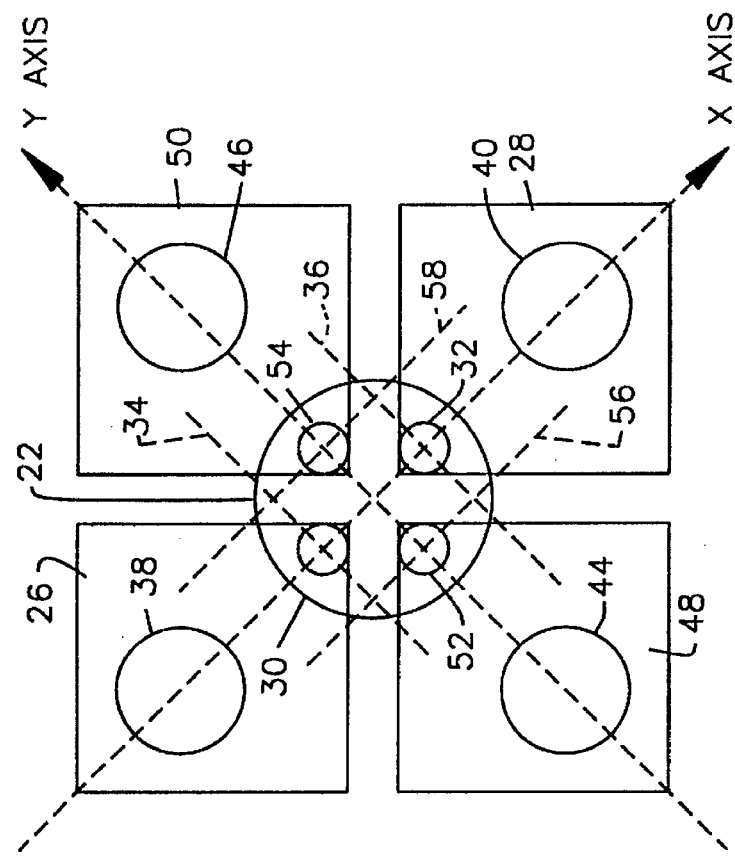
FIG. 3 is a schematic plan view of the folded positioner of FIG. 2 using four small motion transducer actuators and arranged for two dimensional horizontal movement by tilting.

FIG. 3 shows the addition of two more actuators to the arrangement shown in FIG. 2 so as to effect two dimensional motion of the probe tip 18. Thus, the actuators 38, 40 control motion along the x axis. Arranged symmetrically and orthogonally thereto, are identical actuators 44, 46, along with their respective intermediate support members 48, 50, and respective pivot balls 52, 54, having respective pivot axes 56, 58. The actuators 44, 46 are coupled to the controller 42 (FIG. 2), which controls their energizations so as to achieve a desired y axis component of horizontal movement. It is clear from FIG. 3 that the first and second pivot balls 30, 32 are positioned along a line parallel to the x axis of movement of the probe tip 18 and, likewise, the third and fourth pivot balls 52, 54 are positioned along a line parallel to the y axis of movement of the probe tip 18. These lines connecting their respective pivot ball pairs, as well as the x and y axes, intersect at the central longitudinal axis 24 of the tube 22. As shown, the pivot balls 30, 32, 52, 54 are equidistant from the longitudinal axis 24 so that they may be considered as being positioned at respective corners of a square centered at the longitudinal axis 24. However, although it is preferable that within each pair of opposed actuators the distances of the actuators from the axis 24 are equal, from pair to pair these distances need not be the same.

Preferably, movement of each of the actuators 38, 40, 44, 46 is in a direction that is parallel to the longitudinal axis 24 when the tube 22 is in an untilted position. In addition to the four actuator embodiment previously described, it is also contemplated that two dimensional motion of the probe tip 18 can be effected using three actuators. In the three actuator embodiment, the actuators are arranged in a triangular configuration about the longitudinal axis of the tube 22.

In addition to its long range, the aforedescribed positioner possesses at least two other significant advantages. A first of these advantages is that it reduces errors arising from Abbé offset. Abbe offset occurs when a position sensor, such as a capacitive sensor in a scanning probe microscope, does not lie in the plane of the probe tip. Any uncontrolled tilting of the scan head can cause motion of the probe tip that may not be detected by the position sensor. The advantage of the aforedescribed inventive arrangement is that the tilt is very well controlled and predictable, so any necessary correction to the measured position can be easily made. A second of these advantages is that the folded design and symmetry of the inventive positioner reduces errors arising from thermal expansion (i.e., it is inherently thermally compensated). The thermal compensation is illustrated in FIG. 2. The system can be designed by taking advantage of the thermal expansion characteristics of its component parts so that the position of the probe tip 18 is held constant relative to the base 20 as the ambient temperature changes. This can be accomplished by arranging to have the ratio of the two lengths $L_1$ and $L_2$ inversely proportional to the ratio of the two thermal expansion coefficients $E_1$ and $E_2$, where the subscript 1 refers to the tube 22 and the subscript 2 refers to one of the actuators 38, 40, 44, 46 (which are identical), since these make up the bulk of the different lengths. Thus:

$$(L_1/L_2)=(E_2/E_1).$$

Accordingly, when the temperature changes the two lengths $L_1$ and $L_2$ change by the same amount.

Figures 4, 5, 6:
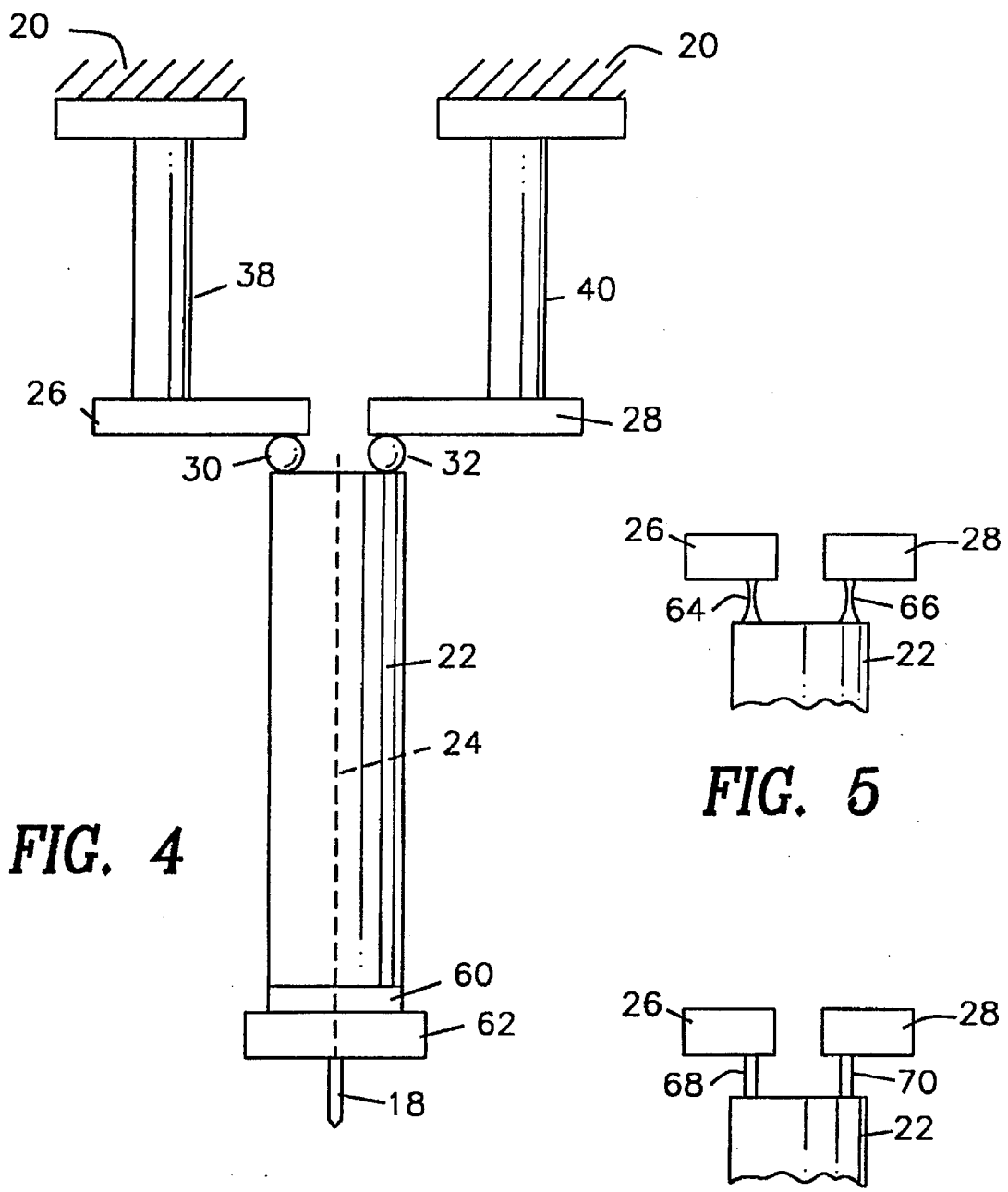
FIG. 4 is a side view of an unfolded positioner similar to that shown in FIG. 2.
FIGS. 5 and 6 illustrate alternate pivots to the balls shown in FIGS. 2–4.

While the folded design shown in FIG. 2 possesses the advantages of compactness and thermal compensation, there may be applications where these advantages are not needed. As shown in FIG. 4, the inventive concept is also applicable to an unfolded design.

Further, while solid ruby spheres have been cited as exemplary pivots, other pivots can be utilized. Thus, FIG. 5 indicates that generic flexures 64, 66, which bend at their narrow regions, can be utilized, and FIG. 6 indicates that stiff wires 68, 70 can also be utilized.

Figure 7:
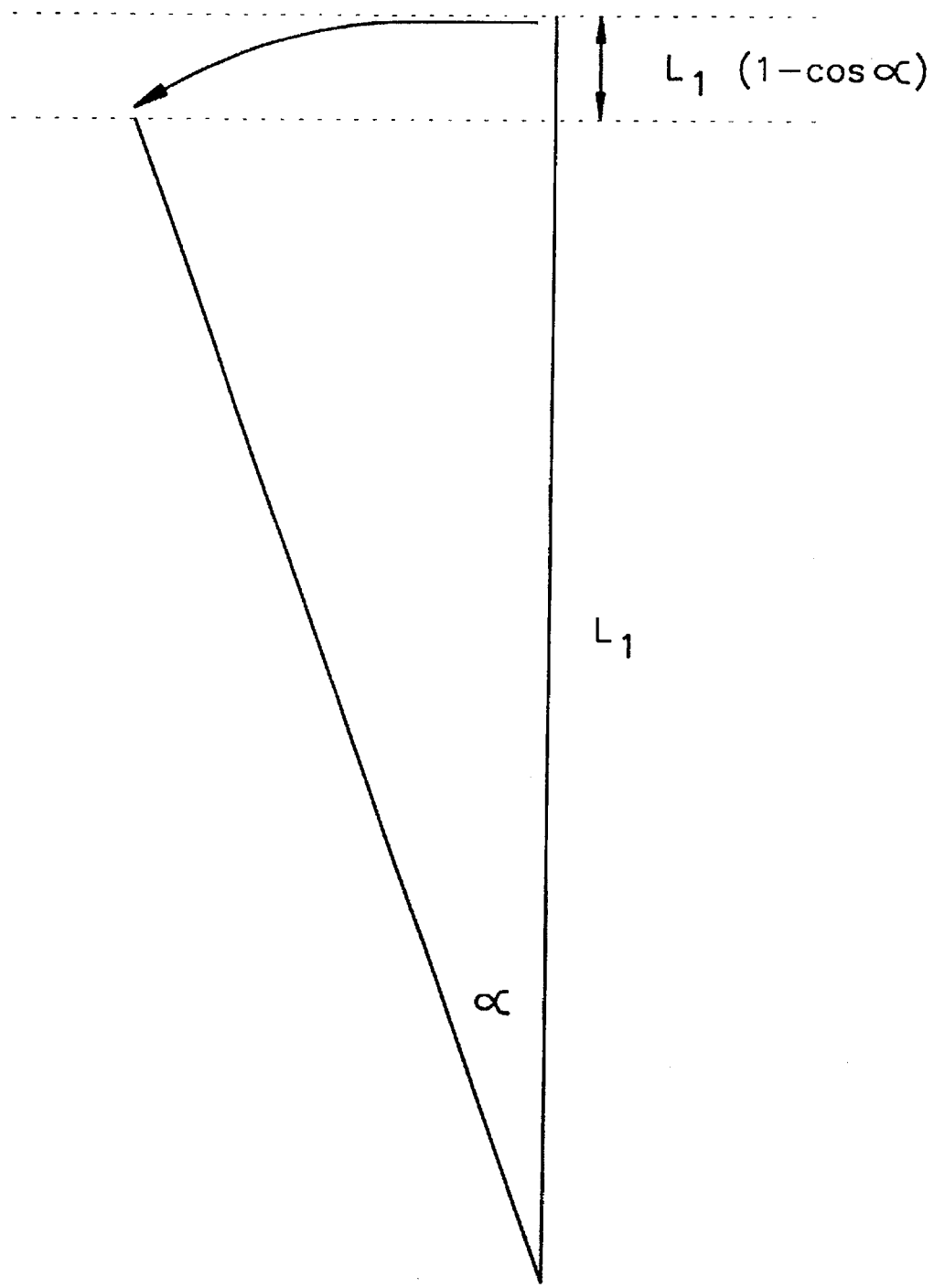
FIG. 7 is a diagram useful for understanding the geometry of vertical motion of the probe tip during horizontal movement by tilting.

FIG. 7 illustrates the vertical motion of the probe tip as tilting occurs. Thus, when the tube 22 is tilted at an angle $\alpha$, the vertical displacement of the probe tip caused by the tilting is equal to $L_1 (1-\cos\alpha)$. For dimensions and motions typical in a scanning probe microscope, the total vertical displacement is on the order of 10 mm. This can be compensated in several ways. Referring to FIG. 2, a small expansion actuator 60 can be added to the tube 22 to counteract this motion. Alternatively, the main z axis actuator 62 can be controlled to counteract the motion. Also, the tilt actuators 38, 40, 44, 46 can be driven so as to counteract the vertical motion.

Accordingly, there has been disclosed an improved tilting positioner for a micropositioning device which eliminates Abbaoffset error. While illustrative embodiments of the inventive concept have been disclosed herein, it is understood that other embodiments and modifications may be apparent to those of ordinary skill in the art and it is intended that this invention be limited only by the scope of the appended claims.

What is claim is:

1. A positioner for a micropositioning device to control one dimensional horizontal movement between a pair of elements, the positioner comprising:

a rigid elongated member having a first free end and a second pivot end, said member being coupled at said free end to a first of said elements so as to prevent relative horizontal movement therebetween, and said member having a longitudinal axis extending from said free end to said pivot end;

a pair of rigid intermediate support members;

a first pivotal coupling on a first side of said longitudinal axis for pivotably coupling the pivot end of said elongated member to a first of said support members;

a second pivotal coupling across said longitudinal axis from said first pivotal coupling for pivotably coupling the pivot end of said elongated member to a second of said support members;

a first small motion transducer actuator having a first end coupled to said first support member so as to prevent relative movement therebetween and an opposite end coupled to a second of said elements so as to prevent relative movement therebetween, said first actuator being controllable for effecting relative movement between said first support member and said second element so as to cause said elongated member to tilt;

a second small motion transducer actuator having a first end coupled to said second support member so as to prevent relative movement therebetween and an opposite end coupled to the second of said elements so as to prevent relative movement therebetween, said second actuator being controllable for effecting relative movement between said second support member and said second element so as to cause said elongated member to tilt; and control means for selectively energizing said first and second actuators to cause differential motion of said first and second support members;

whereby said elongated member is caused to tilt in a controlled manner to move the elongated member free end along a tilt line.

2. The positioner according to claim 1 further including a third small motion transducer actuator coupled to said elongated member and energizable by said control means for selectively causing movement of said first element relative to said first and second support members along the longitudinal axis of said elongated member;

whereby vertical movement of said elongated member due to tilting is compensated.

3. The positioner according to claim 1 wherein said elongated member is coupled to said support members so that it extends on the same side of said support members as said actuators.

4. The positioner according to claim 3 wherein:

said first and second actuators have the same coefficient of thermal expansion and the same length; and the ratio of the length of the elongated member to the length of each actuator is inversely proportional to the ratio of the coefficient of thermal expansion of the elongated member to the coefficient of thermal expansion of each actuator;

whereby temperature compensation is attained.

5. The positioner according to claim 1 wherein each of said first and second pivotal couplings comprises a respective pivot ball secured to said elongated member second pivot end and to a respective one of said support members.

6. The positioner according to claim 5 wherein each of said pivot balls is a solid ruby sphere.

7. The positioner according to claim 1 wherein said pivotal couplings are positioned along a movement axis parallel to said tilt line.

8. The positioner according to claim 1 arranged for two dimensional horizontal movement and further comprising:

third and fourth rigid intermediate support members;

a third pivotal coupling for pivotably coupling the pivot end of said elongated member to said third support member;

a fourth pivotal coupling across said longitudinal axis from said third pivotal coupling for coupling the pivot end of said elongated member to said fourth support member;

a third small motion transducer actuator having a first end coupled to said third support member so as to prevent relative movement therebetween and an opposite end coupled to said second element so as to prevent relative movement therebetween, said third actuator being controllable for effecting relative movement between said third support member and said second element so as to cause said elongated member to tilt; and a fourth small motion transducer actuator having a first end coupled to said fourth support member so as to prevent relative movement therebetween and an opposite end coupled to said second element so as to prevent relative movement therebetween, said fourth actuator being controllable for effecting relative movement between said fourth support member and said second element so as to cause said elongated member to tilt;

wherein said control means is further effective for selectively energizing said third and fourth actuators to cause differential motion of said third and fourth support members.

9. The positioner according to claim 8 wherein:

a first line through said first and second pivotal couplings orthogonally intersects a second line through said third and fourth pivotal couplings at said longitudinal axis;

whereby said elongated member is caused to tilt so that said elongated member free end partakes of two dimensional movement within an orthogonal axis coordinate system having a first coordinate axis parallel to said first line and a second coordinate axis parallel to said second line, with said first and second actuators controlling movement parallel to said first coordinate axis and said third and fourth actuators controlling movement parallel to said second coordinate axis.

10. The positioner according to claim 9 wherein said first, second, third and fourth pivotal couplings are positioned at respective corners of a square centered at said elongated member longitudinal axis.

11. The positioner according to claim 8 further including a fifth small motion transducer actuator coupled to said elongated member and energizable by said control means for selectively causing movement of said first element relative to said support members along the longitudinal axis of said elongated member;

whereby vertical movement of said elongated member due to tilting is compensated.

12. The positioner according to claim 8 wherein said elongated member is coupled to said support members so that it extends on the same side of said support members as said actuators.

13. The positioner according to claim 12 wherein:

said first, second, third and fourth actuators have the same coefficient of thermal expansion and the same length; and the ratio of the length of the elongated member to the length of each actuator is inversely proportional to the ratio of the coefficient of thermal expansion of the elongated member to the coefficient of thermal expansion of each actuator;

whereby temperature compensation is attained.

14. The positioner according to claim 8 wherein each of said first, second, third and fourth pivotal couplings comprises a respective pivot ball secured to said elongated member pivot end and to a respective one of said support members.

15. The positioner according to claim 14 wherein each of said pivot balls is a solid ruby sphere.

16. The positioner according to claim 8 wherein movement of each of said-actuators is in a direction that is parallel to the longitudinal axis of said elongated member when said elongated member is in an untilted position.

17. The positioner according to claim 1 wherein said rigid elongated member comprises a cylindrical tube of rigid material.

18. The positioner according to claim 17 wherein said rigid elongated member comprises a quartz tube.

19. The positioner according to claim 1 wherein each of said small motion transducer actuators comprises a respective hollow piezoceramic cylinder having internal and external electrodes.

20. The positioner according to claim 1 wherein movement of each of said actuators is in a direction that is parallel to the longitudinal axis of said elongated member when said elongated member is in an untilted.

21. A positioner for a micropositioning device to control two dimensional horizontal movement between a pair of elements, the positioner comprising:

a rigid elongated member having a first free end and a second pivot end, said member being coupled at said free end to a first of said elements so as to prevent relative horizontal movement therebetween, and said member having a longitudinal axis extending from said free end to said pivot end;

three rigid intermediate support members;

three pivotal couplings each for pivotably coupling the pivot end of said elongated member to a respective one of said support members, said pivotal couplings being arranged in a triangular configuration about said longitudinal axis;

three substantially parallel small motion transducer actuators each having a first end coupled to a respective one of said support members so as to prevent relative movement therebetween and an opposite end coupled to a second of said elements so as to prevent relative movement therebetween, each of said actuators being controllable for effecting relative movement between the respective one of said support members and said second element so as to cause said elongated member to tilt; and control means for selectively energizing said actuators to cause differential motion of said support members;

whereby said elongated member is caused to tilt in a controlled manner to move the elongated member free end.

\* \* \* \* \*